US008842723B2

(12) United States Patent
Zhang et al.

(10) Patent No.: US 8,842,723 B2
(45) Date of Patent: Sep. 23, 2014

(54) VIDEO CODING SYSTEM USING IMPLIED REFERENCE FRAMES

(75) Inventors: Ke Zhang, Leuven (BE); Dazhong Zhang, Milpitas, CA (US); Douglas Scott Price, San Jose, CA (US); Hsi-Jung Wu, San Jose, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 495 days.

(21) Appl. No.: 12/986,703

(22) Filed: Jan. 7, 2011

(65) Prior Publication Data

US 2012/0170654 A1 Jul. 5, 2012

Related U.S. Application Data

(60) Provisional application No. 61/429,309, filed on Jan. 3, 2011.

(51) Int. Cl.
*H04N 7/26* (2006.01)
*H04N 7/32* (2006.01)
*H04N 19/00* (2014.01)
*H04N 19/50* (2014.01)

(52) U.S. Cl.
CPC ... *H04N 7/26* (2013.01); *H04N 7/32* (2013.01)
USPC .................. 375/240; 375/240.16; 375/240.25

(58) Field of Classification Search
None
See application file for complete search history.

(56) References Cited

U.S. PATENT DOCUMENTS

| 4,951,140 | A | 8/1990 | Ueno et al. |
| 5,812,787 | A | 9/1998 | Astle |
| 8,325,796 | B2 * | 12/2012 | Wilkins et al. ........... 375/240.02 |
| 8,428,125 | B2 * | 4/2013 | Oguz ........................ 375/240.08 |
| 8,488,666 | B2 * | 7/2013 | Puri et al. ................. 375/240.01 |
| 2004/0032906 | A1 | 2/2004 | Lillig |
| 2005/0013365 | A1 | 1/2005 | Mukerjee et al. |
| 2006/0120464 | A1 * | 6/2006 | Hannuksela ............. 375/240.27 |

(Continued)

FOREIGN PATENT DOCUMENTS

| DE | 3608489 A1 | 9/1987 |
| JP | H01-198884 A | 8/1989 |

(Continued)

OTHER PUBLICATIONS

Ngo, et al, "Video Partitioning by Temporal Slice Coherency", IEEE Trans. Circuits and Systems for Video Technology, vol. 11, No. 8, Aug. 2001, pp. 941-953.*

(Continued)

*Primary Examiner* — Jayanti K Patel
*Assistant Examiner* — Reza Aghevli
(74) *Attorney, Agent, or Firm* — Kenyon & Kenyon LLP

(57) ABSTRACT

A video coding/decoding system builds implied reference frames from a plurality of reference frames developed during coding. Coded data of reference pictures are decoded and stored in a reference picture cache. An implied reference frame may be derived from a plurality of reference frames and may be stored in the reference picture cache. Thereafter, coding of new input data may proceed using the implied reference frame as a source of prediction. The method may be used to identify visual elements such as background elements that may persist in video over a longer period that can be captured by the system under conventional reference frames assembly and eviction. Implied reference frames may be built at both an encoder and a decoder to serve as sources of prediction.

23 Claims, 7 Drawing Sheets

(56) References Cited

U.S. PATENT DOCUMENTS

| | | |
|---|---|---|
| 2006/0188025 A1 | 8/2006 | Hannuksela |
| 2007/0008323 A1 | 1/2007 | Zhou |
| 2007/0081586 A1* | 4/2007 | Raveendran et al. ...... 375/240.1 |
| 2009/0324023 A1 | 12/2009 | Tian et al. |
| 2010/0008424 A1 | 1/2010 | Pace |
| 2010/0111182 A1* | 5/2010 | Karczewicz et al. .... 375/240.16 |
| 2010/0208808 A1* | 8/2010 | Wiegand .................. 375/240.12 |

FOREIGN PATENT DOCUMENTS

| | | |
|---|---|---|
| JP | H10-023423 A | 1/1998 |
| JP | H11-317947 A | 11/1999 |
| JP | 2000-059796 A | 2/2000 |
| JP | 2000-299865 A | 10/2000 |
| JP | 2003-032688 A | 1/2003 |
| WO | 89/04101 | 5/1989 |

OTHER PUBLICATIONS

International Search Report and Written Opinion of ISA, dated Mar. 21, 2012, from corresponding International Patent Application No. PCT/US2012/020037 filed Jan. 3, 2012.

Japanese Office Action, mailed Jun. 30, 2014, from corresponding Japanese Patent Application No. 2013-547718, filed Jun. 10, 2013.

* cited by examiner

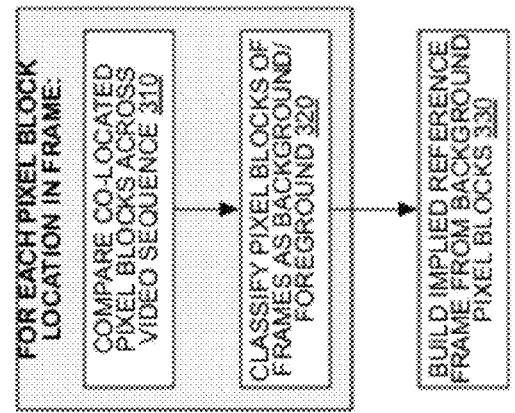
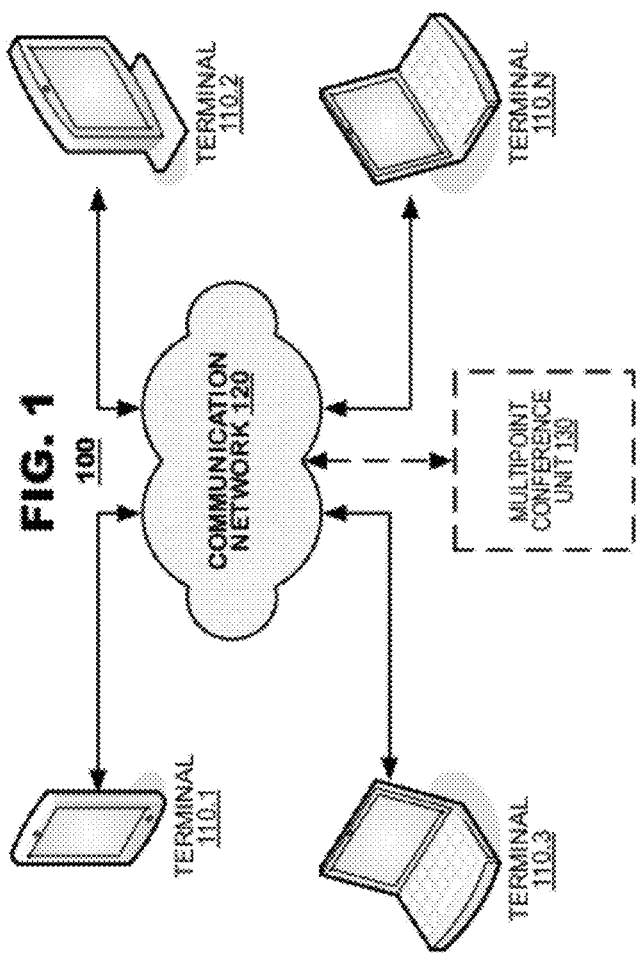

VIDEO CODING SYSTEM USING IMPLIED REFERENCE FRAMES

BACKGROUND

Video coding/decoding systems find widespread application in many communication environments. They typically capture audio-visual content at a first location, code the content according to various bandwidth compression operations, transmit the coded content to a second location and decode the content for rendering at the second location. For video content, coding and decoding typically exploits temporal and spatial redundancies in the content, using motion compensated prediction techniques to reduce bandwidth of the coded signal.

Motion compensation techniques involve prediction of a new input frame using one or more previously-coded frames as a basis for the prediction. Video coders and decoders both store decoded versions of select frames that have been designated as "reference frames." When a new input frame is to be coded according to motion compensation technique, an encoder searches among the reference frame for content that closely matches content of the input frame. When a match is found, the encoder typically identifies the matching reference frame to the decoder, provides motion vector that identify spatial displacement of the matching content with respect to the input content and codes residual data that represents a difference between the input data and the matching content of the reference frame. A decoder stores the same set of reference frames as does the encoder. When it is provided with identifiers of reference frames, motion vectors and coded residual data, the decoder can recover a replica of each input frame for display. Frames typically are parsed into spatial arrays of data (called "pixel blocks" herein) and motion vectors and coded residual data may be provided for each pixel block of the input frame.

Motion compensated prediction, therefore, requires that video coders and decoders both store a predetermined number of reference frames for use in coding and decoding. Modern coding protocols, such as H.263 and H.264 define predetermined limits on the number of reference frames that are to be stored at encoders and decoders. Thus, encoders and decoders typically are provided with a cache that stores only a predetermined number reference pictures. During operation, if a reference picture cache stores the maximum number of reference pictures and a new reference picture is to be added, then a previously-stored reference picture will be evicted from the cache to accommodate the new reference picture. The evicted reference cannot thereafter be used as a basis for predicting new input frames.

The limited depth of reference picture caches is unsatisfactory for many coding applications. In applications where image content may include moving foreground content over a relatively static background, background elements are likely to have very high temporal redundancy and can be coded efficiently. However, if a foreground element obscures a background element for such a long duration that the reference picture cache has evicted any reference frames that include the background element, a video coder will be unable to code it predictively if the foreground element moves again and the formerly-obscured background element is revealed.

Accordingly, there is a need in the art for a predictive coding system that effectively extends the reach of motion compensated prediction techniques to include content of reference pictures that have been evicted from encoder and decoder caches.

BRIEF DESCRIPTION OF THE DRAWINGS

FIG. 1 illustrates a video coding system according to an embodiment of the present invention.

FIG. 3 illustrates a method according to an embodiment of the present invention.

DETAILED DESCRIPTION

Figure 2:
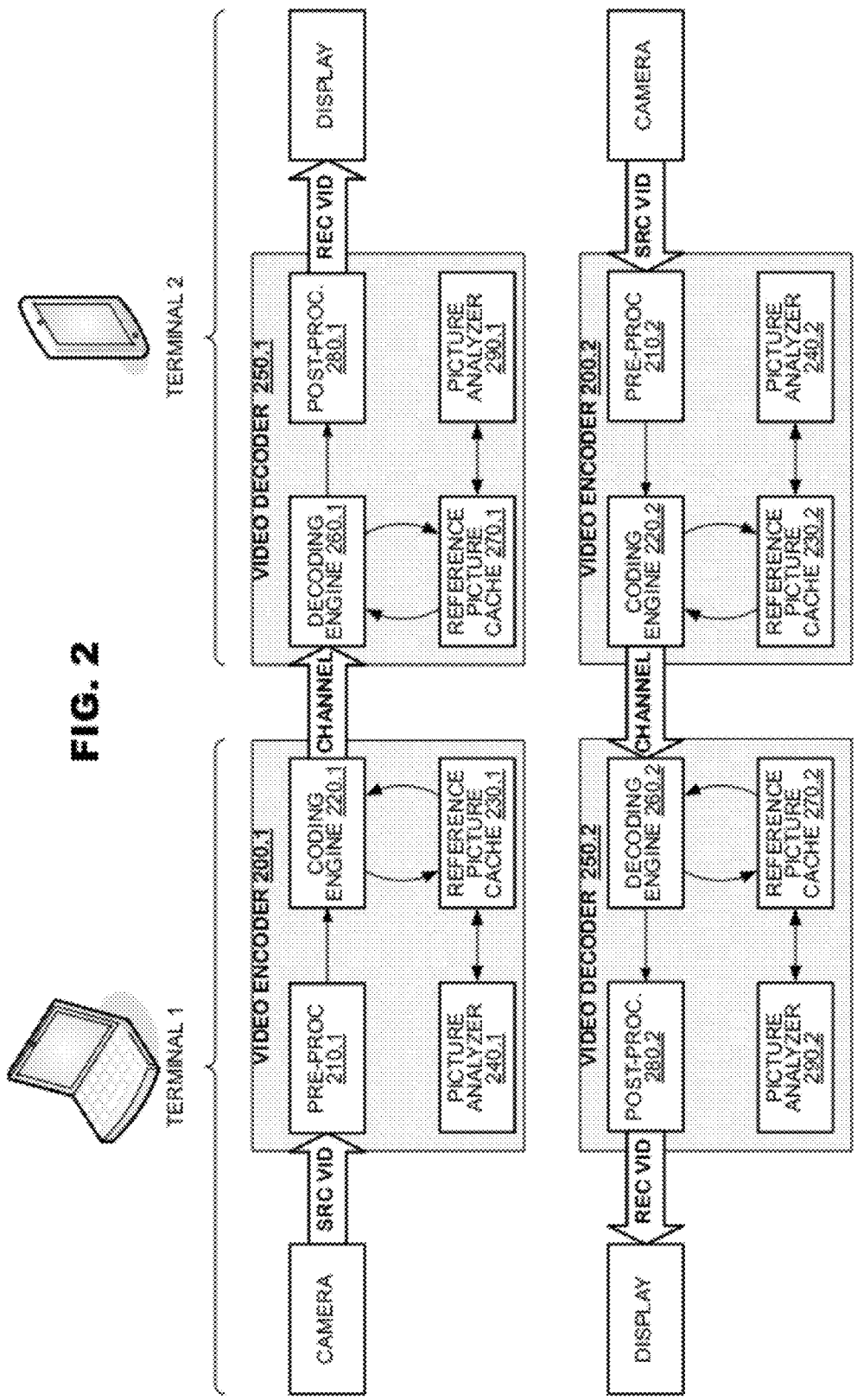
FIG. 2 is a simplified functional block diagram of video encoders and video decoders according to an embodiment of the present invention.

Embodiments of the present invention provide a video coding/decoding system that builds implied reference frames from a plurality of reference frames developed during coding. Coded data of reference pictures are decoded and stored in a reference picture cache. An implied reference frame may be derived from a plurality of reference frames and may be stored in the reference picture cache. Thereafter, coding of new input data may proceed using the implied reference frame as a source of prediction. The method may be used to identify visual elements such as background elements that may persist in video over a longer period that can be captured by the system under conventional reference frames assembly and eviction. Implied reference frames may be built at both an encoder and a decoder to serve as sources of prediction.

FIG. 1 illustrates a video coder/decoder system 100 according to an embodiment of the present invention. The system 100 may include a plurality of terminal devices 110.1-110.N interconnected via a communication network 120. The terminal devices may support video conferencing functions and, therefore, may include associated hardware and software (described below) to capture audio-visual data of a user of the terminal, code the captured data and transmit the data to another terminal. Each terminal also may include associated hardware and software (also described below) to receive coded audio-visual data from another terminal, decode the coded data and render the decoded data on an output device such as a display and speakers. The terminals 110.1-110.N may transmit and receive coded video data with each other via one or more interconnecting networks 120, which may be embodied as a communications or computer network. The network 120 may be provisioned as a packet-based network, which may be wired or wireless. For the purposes of the present discussion, the architecture and operation of the network 120 is immaterial to the operation of the present invention unless otherwise noted herein.

The principles of the present invention find application in a variety of coding applications, including video conferencing, among others. In a video conferencing application, each terminal (say, terminal 110.1) may capture video information of a local scene via its camera, may code the data and transmit it to another terminal (say, terminal 110.2). Similarly, the other terminal may capture video information locally, may code it and may transmit the data to the first terminal 110.1. Each terminal 110.1, 110.2 may decode the coded video data it receives from the other terminal and may render the decoded video on a display device.

The principles of the present invention also apply to multi-party conferencing applications, for example, where a first terminal transmits coded video data to multiple remote terminals and receives coded video data from them.

FIG. 2 is a simplified functional block diagram of video encoders 200.1, 200.2 and video decoders 250.1, 250.2 according to an embodiment of the present invention. As illustrated, each terminal (terminals 1 and 2) may include a video encoder 200.1, 200.2 which is paired with a video decoder 250.1, 250.2 of the other terminal.

The video encoder 200.1 may include a pre-processor 210.1, a coding engine 220.1, a reference picture cache 230.1 and a picture analyzer. The pre-processor 210.1 may accept source video from an image capture device such as a camera and may perform various processing operations on the source video to condition it for coding. The coding engine 220.1 may perform bandwidth compression operations on the pre-processed source video to reduce spatial and temporal redundancy therein. The coding engine may output coded video data to a channel for delivery to the video decoder 250.1. As part of its operation, the coding engine also may decode the coded video data of reference frames, frames that may be used as sources of prediction for later-coded source video. The decoded reference frames may be stored in the reference picture cache 230.1 during coding of subsequently received source video. The picture analyzer 240.1 may generate implied reference frames from frames stored in the reference picture cache 230.1, as discussed below.

The pre-processor 210.1 may perform video processing operations on a source video sequence. The pre-processor may include an array of filters (not shown) such as de-noising filters, sharpening filters, smoothing filters, bilateral filters and the like that may be applied dynamically to the source video based on characteristics observed within the video. Typically, the pre-processor conditions the source video data to render bandwidth compression more efficient or to preserve image quality in light of data losses that may be incurred as the coding engine 220.1 operates.

The coding engine 220.1 may code input video data according to a variety of different coding techniques to achieve bandwidth compression. The coding engine may compress the images by a motion-compensated prediction. Frames of the input video may be assigned a coding type, such as intra-coding (I-coding), uni-directionally predictive coding (P-coding) or bi-directionally predictive coding (B-coding). The frames further may be parsed into a plurality of pixel blocks and may be coded by transform coding, quantization and entropy coding. Pixel blocks of P- and B-coded frames may be coded predictively, in which case, the coding engine may calculate motion vectors identifying pixel blocks of decoded frames stored in the reference picture cache 230.1 that serve as predictions of the pixel blocks being coded and may generate prediction residuals prior to engaging the transform coding. In an embodiment, the video encoder may operate according to coding protocols governed by ITU H.263, H.264 and the like.

The video decoder 250.1 may include a decoding engine 260.1, a reference picture cache 270.1, a post-processor 280.1 and a picture analyzer 290.1. The decoding engine 260.1 may decode coded video data received via the channel with reference to reference pictures stored in the reference picture cache. The decoding engine 260.1 may output decoded video data to the post-processor 280.1, which may perform additional operations on the decoded video data to condition it for display. Decoded video data of reference frames also may be stored to the reference picture cache 270.1 for use during decoding of subsequently-received coded video data. The picture analyzer 290.1 may generate implied reference frames from frames stored in the reference picture cache 270.1, as discussed below.

The decoding engine 260.1 may perform decoding operations that invert coding operations performed by the coding engine 220.1. The decoding engine 260.1 may perform entropy decoding, dequantization and transform decoding to generate recovered pixel block data. Quantization/dequantization operations are lossy processes and, therefore, the recovered pixel block data is a replica of the source pixel blocks that were coded by the video encoder 200.1 but include some error. For pixel blocks coded predictively, the transform decoding may generate residual data; the decoding engine 260.1 may use motion vectors associated with the pixel blocks (which may be implied in some cases) to retrieve predicted pixel blocks from the reference picture cache 270.1 to be combined with the prediction residuals. Decoded pixel blocks may be reassembled into frames and output to the post-processor 280.1.

The post-processor 280.1 may perform additional video processing to condition the recovered video data for rendering, commonly at a display device. Typical post-processing operations may include applying deblocking filters, edge detection filters, ringing filters and the like. The post-processor 280.1 may output recovered video sequence that may be rendered on a display device or, optionally, stored to memory for later retrieval and display.

The picture analyzers 240.1, 290.1 may generate implied reference frames from frames stored in the reference picture cache. The picture analyzers 240.1, 290.1 may analyze a sequence of reference pictures to classify pixel block data in each frame as belong either to a background of the image or a foreground image. The picture analyzers 240.1, 290.1 may synthesize an implied reference frame from the reference frames' pixel block data that are classified as background pixel blocks and may store the implied reference frame to their respective reference picture caches 230.1, 270.1. Thereafter, the coding engine 220.1 may use pixel blocks from the implied reference frame as a prediction reference for later received source video being coded and may transmit motion vectors to the decoder referencing the implied reference frame. Having received coded video data referring to the implied reference frame as a prediction reference, the decoding engine 260.1 may retrieve pixel block data of the implied reference frame from the reference picture cache 270.1 and use it to decode coded video data of the later received source frame.

In an embodiment, operation of the picture analyzers 240.1, 290.1 at the video encoder 200.1 and video decoder 250.1 is performed synchronously. Further, the picture analyzers 240.1, 290.1 operate on frames stored in the reference picture cache that are known to be stored properly at both the video encoder 200.1 and video decoder 250.1. Accordingly, the video encoder 200.1 and video decoder 250.1 may exchange signaling messages to maintain synchronism between these units.

In an embodiment, the video encoder 200.2 and video decoder 250.2 may be provisioned similarly to video encoder 200.1 and video decoder 250.1 to capture video at terminal 2, code it and transmit it to terminal 1 for decoding. Although similarly provisioned, the video encoder/decoder pairs may operate independently of each other. Therefore, pre-processing operations 210.1 and post-processing operations 280.1 of a first video encoder/decoder pair may be selected dynamically with regard to the video content being processed by that pair. Pre-processing operations 210.2 and post-processing operations 280.2 of the second video encoder/decoder pair may be selected dynamically with regard to the video content being processed by the second pair and without regard to the video content being processed by the first pair. Similarly, operation of the picture analyzers 240.1, 290.1 of a first pair may proceed independently of operation of the picture analyzers 240.2, 290.2 of the second pair.

FIG. 3 illustrates a method 300 of building an implied reference picture according to an embodiment of the present invention. According to the method, for each pixel block location within a frame, the method 300 may compare characteristics of pixel blocks at the location across a predetermined video sequence (box 310). The video sequence may include a predetermined number of temporal continuous reference frames, for example, ten frames. Based on the observed characteristics, the method 300 may classify the pixel blocks at the location as belong to a background region or to some other region (box 320), called "foreground" in FIG. 3. Thereafter, the method 300 may build an implied reference frame from the pixel blocks of the sequence that were classified as belong to an image background (box 300).

Figure 4:
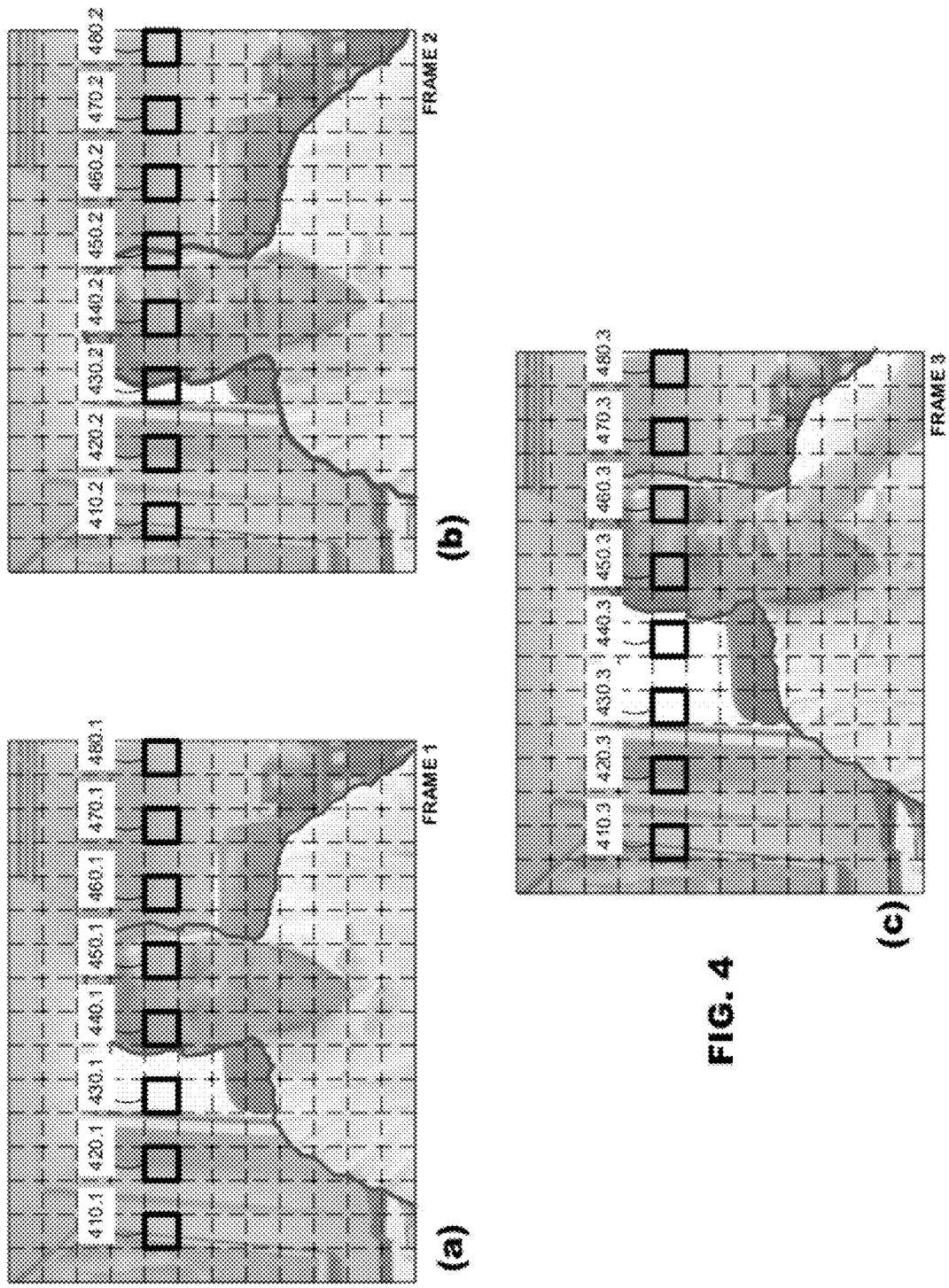
FIG. 4 illustrates operation of the embodiment of FIG. 3 in the context of an exemplary set of reference frames.

FIG. 4 illustrates operation of the method of FIG. 3 in the context of an exemplary set of reference frames. FIGS. 4(*a*)-(*c*) each illustrate image data of a user in a videoconferencing environment in which the user may move with respect to a relatively still background image. The user's silhouette is illustrated in each figure to illustrate exemplary differences between each frame. Only three reference frames are shown in the example of FIG. 4, although the method of FIG. 3 may operate on a longer sequence of reference frames. A series of pixel blocks 410.1-480.1 are illustrated within FIG. 4(*a*); these pixel blocks have co-located counterparts 410.2-480.2, 410.3-480.3 within the frames illustrated in FIGS. 4(*b*) and 4(*c*), respectively.

During operation, the method may compare characteristics of the pixel blocks at location 410.1, 410.2, 410.3. The comparison may indicate that the pixel blocks at this location are quite similar and, therefore, the method is likely to classify all three pixel blocks as belonging to a background image. Operation of the method at pixel block locations 420, 470 and 480 are likely to achieve the same result. In each case, the pixel blocks from all three frames are likely to be evaluated as being quite similar to each other and to have very little motion between them. In each case, the pixel blocks from all three frames (pixel blocks 420.1, 420.2, 420.3, 470.1, 470.2, 470.3, 480.1, 480.2 and 480.3) are likely to be classified as belonging to a background image.

Evaluation of the pixel blocks at locations 430-460 may yield different classifications. As between the three frames of FIG. 4, the method is likely to identify significant differences between the frames due to image content, motion and other activity within the field of view of these pixel blocks. For example, at location 430, the method may identify strong correlation between frames 1 and 3 (pixel blocks 430.1 and 430.3) but weak correlation with pixel block 430.2 from frame 2. Further, pixel block 430.2 may have relatively large frame-to-frame motion associated with it whereas frames 430.1 and 430.3 likely will not have much motion. Based on such characteristics, the method may classify pixel blocks 430.1 and 430.3 as background blocks but not pixel block 430.2.

Similarly, at location 460, the method may identify strong correlation between frames 1 and 2 (pixel blocks 460.1 and 460.2) but weak correlation with pixel block 460.3 from frame 3. Further, pixel block 460.3 may have relatively large frame-to-frame motion associated with it whereas frames 460.1 and 460.2 likely will not have much motion. Based on such characteristics, the method may classify pixel blocks 460.1 and 460.2 as background blocks but not pixel block 460.3.

The method may process pixel blocks at locations 440 and 450 similarly. Although the pixel blocks at these locations are likely to exhibit some correlation between them because the user's face is located in these regions, the pixel blocks likely will have lower correlation between them than the exemplary data shown at locations 410-430 and 460-480 and higher motion. Accordingly, the method may not classify any pixel blocks in these locations as belonging to a background region.

Figure 5:
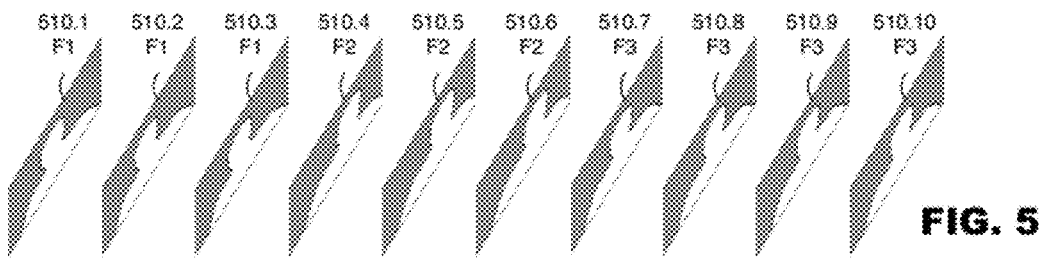
FIG. 5 illustrates another exemplary set of input data illustrating operation of an embodiment of the present invention.

FIG. 4 illustrates operation of the method of FIG. 3 performed upon an exemplary set of three reference frames. During operation, the method may be performed upon a larger set of reference frames, such as ten or fifteen reference frames. FIG. 5 illustrates another exemplary set of input data made up of ten reference frames 510.1-510.10. For purposes of the present discussion, assume that frames 510.1-510.3 closely resemble the image content of frame 1 from FIG. 4(*a*) but for frame-to-frame motion in regions of the image corresponding to the operator's face. These frames are labeled as "F1" in FIG. 5. Similarly, frames 510.4-510.6 resemble the image content of frame 2 (FIG. 4(*b*)) but for frame-to-frame to motion in image regions that correspond to the operator's face and frames 510.7-510.10 resemble the image content of frame 3 (FIG. 4(*c*)) but for frame-to-frame motion in image regions corresponding to the operator's face. Frames 510.4-510.6 are labeled "F2" and frames 510.7-510.10 are labeled "F3" in FIG. 5 for such purposes.

During operation, the method of FIG. 3 may develop a more precise model of background image data using the broader array of image content shown in the example of FIG. 5 than in the example of FIG. 4. Considering pixel block location 440 from FIG. 4(*c*), the method may observe sufficient correlation between frames 510.7-510.10 to classify those pixel blocks as background blocks. The image content as pixel block location 450 (FIG. 4) may not exhibit strong enough correlation across frames to permit classification of any pixel block location as a background pixel block.

Figure 6:
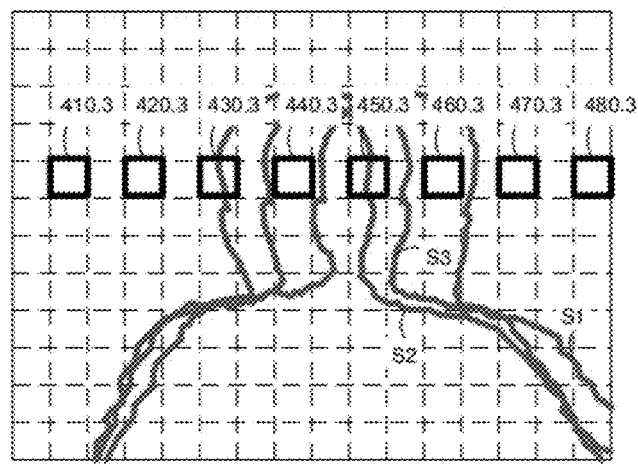
FIG. 6 illustrates an exemplary image model that may be obtained during operation of an embodiment of the present invention.
Figure 7:
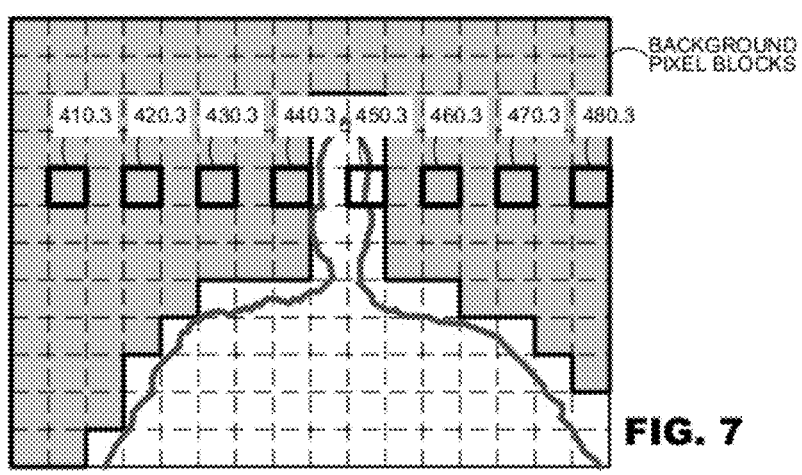
FIG. 7 illustrates another exemplary image model that may be obtained during operation of an embodiment of the present invention.

FIG. 6 illustrates an exemplary image model that may be obtained during operation of the method of FIG. 3. FIG. 6 illustrates superposition of three silhouettes S1-S3 representing locations of foreground image content that may be derived from the exemplary frames 510.1-510.10 of FIG. 5. In this model, image content within each silhouette may exhibit more frame-to-frame motion than image content outside the silhouette. The method may collect image data that falls outside the respective silhouettes as representative of background image data. This process effectively generates a model as shown in FIG. 7, where pixel blocks marked with gray shading would be recognized as background pixel blocks. The implied reference frame may be derived from the background pixel blocks and stored in the reference picture cache.

The present invention accommodates a variety of techniques to determine whether a given pixel block should be classified as belonging to a background image or not. A first embodiment is based on pixel block motion among reference frames. A pixel block displacement vector may be calculated at each pixel block location representing a distance of movement from one reference frame to the next. Pixel blocks that have lowest overall motion within the sequence may be candidates for assignment as belonging to a background image. Additionally, if co-located pixel blocks from a plurality of consecutive reference frames exhibit common motion from reference frame to reference frame, this may be used as an indicator that the reference frame pixel blocks are members of a background image. As a corollary, if co-located pixel blocks from a plurality of consecutive reference frames exhibit inconsistent or erratic motion, this may be used as a basis to reject the pixel blocks as being members of a background image.

By extension, the method further may consider relative motion among the pixel blocks of a reference frame with co-located pixel blocks from temporally adjacent non-reference frames. If co-located pixel blocks from a plurality of temporally adjacent frames exhibit common motion with pixel blocks from a reference frame, this may be used as an indicator that the reference frame pixel blocks are members of a background image. And, if co-located pixel blocks from a plurality of temporally adjacent frames exhibit inconsistent or erratic motion with respect to pixel blocks from the reference frame, this may be used as a basis to reject the pixel blocks as being members of a background image.

Further, the method may consider motion properties in conjunction with edge detection operations. An encoder may perform edge detection to identify elements within the image data, and then evaluate image motion for regions on opposite sides of the detected edges. If an image region on a first side of a detected image exhibits relatively consistent motion across a plurality of reference frames, it may suggest that the region (and, by extension, the pixel blocks located on that side of the edge) may be classified as a background image element.

The method also may consider motion properties of the image in conjunction with a global motion vector assigned to the image. Many encoders perform pre-processing operations that, in part, estimate motion on a frame-by-frame basis. Further, some encoders operate with cameras that employ motion detectors to detect movement of a camera device during operation. In either case, as motion of individual pixel blocks within a reference image is evaluated for purposes of classifying the pixel block as belonging to a background element, the pixel block motion may be compared to the global motion estimate. When a pixel block exhibits motion that differs from a global motion estimate applied to the frame, the pixel block may be disqualified from classification as a background image element.

The method also may consider spatial correlation among pixel blocks as part of performing background classification. In such an embodiment, the method may compare pixel block image content with image content of neighboring pixel blocks within the same frame. For example, the method may compare transform coefficients among neighboring coded pixel blocks to assess such correlation. When pixel blocks exhibit high correlation to neighboring pixel blocks, such correlations can be used as a basis to identify background pixel blocks.

Of course, the principles of the present invention accommodate integration of a variety of the foregoing techniques. In one embodiment, motion and spatial correlation tests may be applied to individual pixel blocks within a reference frame. Motion assessments and spatial correlations assessments may be scored separately, then joined into an aggregate score from which the system may designate the pixel block as a background element or not.

Having identified a collection of pixel blocks in each frame location as belonging to a background, the system may build an implied reference frame therefrom. The implied reference frame may be assembled by averaging content of the pixel blocks together or by copying content from a pixel block that is most similar to a pixel block obtained by the averaging. Null data (for example, pure black or pure white data) may be stored in frame locations for which no background pixel blocks were identified.

Figure 8:
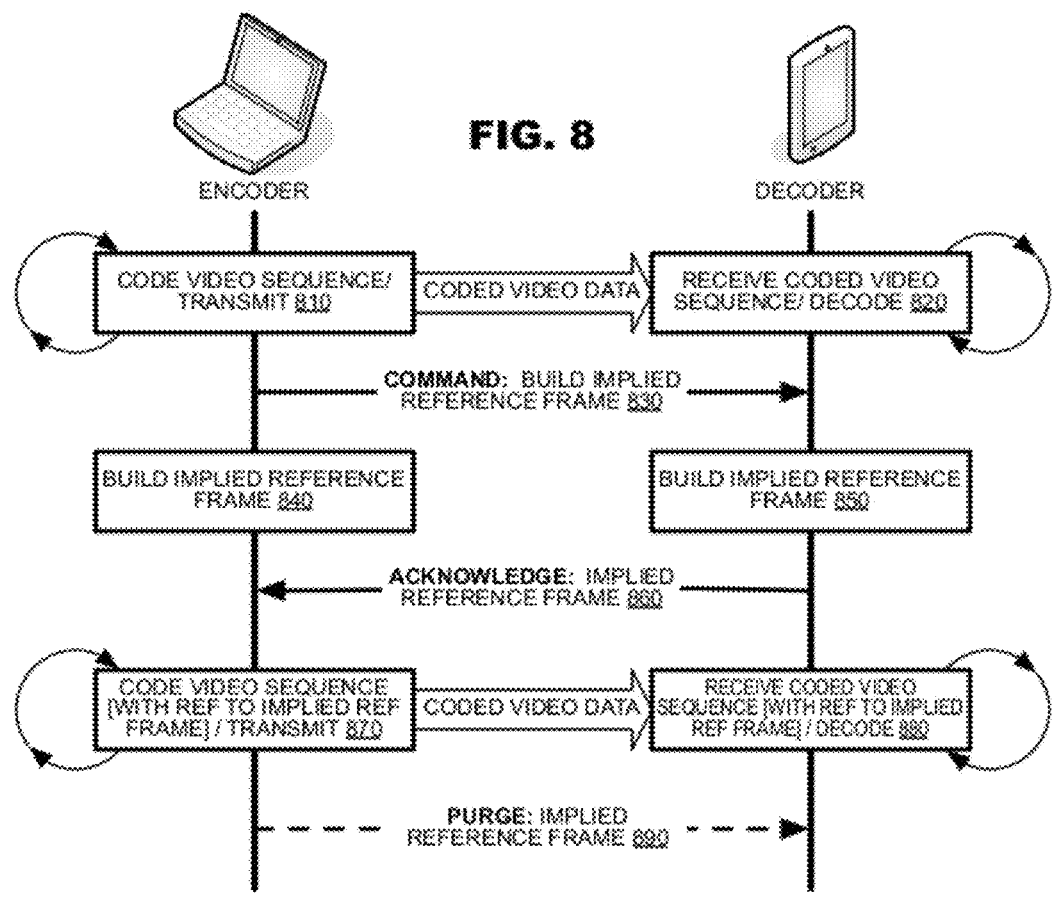
FIG. 8 illustrates a communication protocol according to an embodiment of the present invention.

FIG. 8 illustrates a communication protocol between an encoder and a decoder according to an embodiment of the present invention. According to the protocol, prior to development of any implied reference frames, the encoder may code frames from the video sequence and transmit coded video data obtained thereby to a decoder (block 810). The decoder may receive the coded video sequence and decode it (block 820). The encoder also may decode the coded reference frames transmitted to the decoder (operation not shown). In the absence of transmission errors, the encoder and decoder should store a common set of reference frames locally at each device.

When the encoder determines to utilize an implied reference frame, it may include a command to the decoder to build an implied reference frame (block 830). The encoder command may be included in channel data along with coded video data. The encoder command may identify a set of reference frames from which the implied reference frame may be derived. Thereafter, the encoder and decoder each may build implied reference frames from the reference frames stored in their local caches (blocks 840, 850). If the decoder successfully builds an implied reference frame and stores it, the decoder may transmit an acknowledgment message to the encoder identifying it as such (block 860). The acknowledgment message may include an index to be used by the encoder and decoder for future coding.

After the encoder receives the acknowledgment message, the encoder may perform future coding operations with reference to the implied reference frame. That is, the implied reference frame may be used as a source of prediction during coding of later-received source frames in the same manner that any other reference frame can be used. As the encoder codes later-received portions of the video sequence and transmits it to the decoder (block 870), it may include coded frames that refer to the implied reference frame as a source of prediction. Similarly, the decoder may receive and decode the coded video (block 880), using its local copy of the implied reference frame as a prediction source as dictated by the coded video data.

During operation, an encoder may control how a decoder retains implied reference frames in its reference picture cache. For example, the encoder may include command messages 890 to purge implied reference frames from the decoder's reference picture cache. Of course, the encoder may issue new commands 830 to build new implied reference frames as circumstances warrant. The system may repeat operation of blocks 840, 850 to build and retain multiple implied reference frames simultaneously.

As indicated, a command message 830 may include an identifier of the reference frames that the encoder and decoder are to use to build implied reference frames. The command message 830 may take many formats. In a first embodiment, the command message 830 may identify the reference frames expressly by, for example, a time stamp, frame number or other express identifier. In another embodiment, the command message 830 may identify an integer number of reference frames to be used (say, N frames), which impliedly identify the N most recently transmitted reference frames included in the channel data. In either case, once the decoder interprets the command message, it may determine whether the identified reference frames are present in the reference picture cache. If the identified reference frames are not present, for example because transmission errors prevented their reception, the decoder will be unable to build the implied reference frames. In this event, the decoder should send an acknowledgement message (not shown) indicating that the decoder's attempt to build implied reference frame was not successful. In response to this rejection notification from the decoder, the encoder may abandon its attempt to build an implied reference frame on its side of the communication channel. Instead, the encoder may issue another command to build an implied reference frame identifying a different set of reference frames.

As noted, coding engines 220.1, 220.2 and decoding engines 260.1, 260.2 may perform coding operations as determined by a predetermined coding protocol such as ITU H.263 or H.264. Although such coding protocols do not provide for the command and acknowledgment messages 830, 860 described hereinabove, the protocols may be amended to accommodate such messages. Accordingly, it is permissible to include a command and acknowledgement protocol as an exchange conducted between the coding engines 220.1, 220.2 and decoding engines 260.1, 260.2 of such coders.

Figure 9:
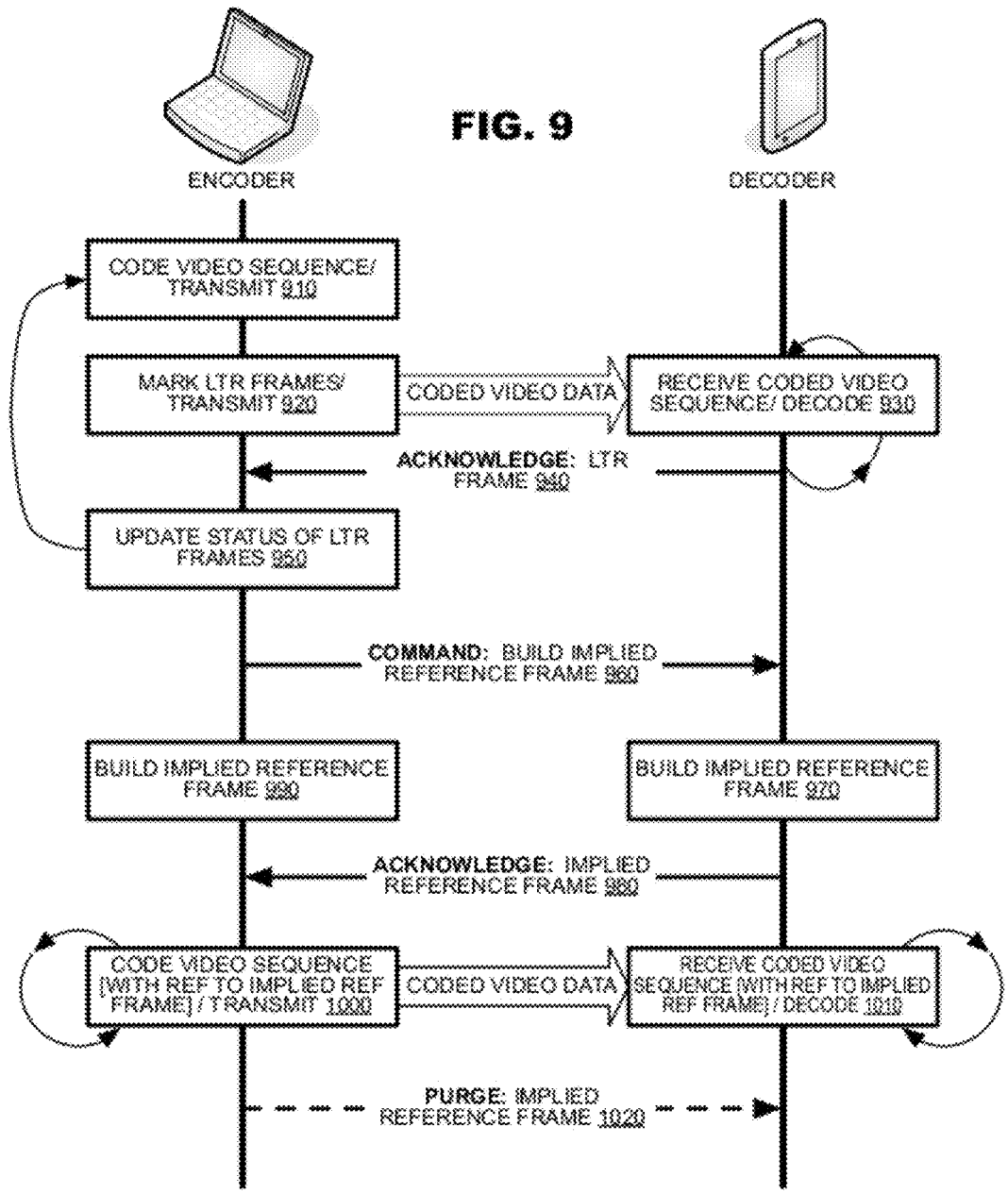
FIG. 9 illustrates another communication protocol according to another embodiment of the present invention.

FIG. 9 illustrates another communication protocol between an encoder and a decoder according to an embodiment of the present invention. In this protocol, the encoder and decoder may build implied reference frames from long term reference ("LTR") frames. LTR frames are defined by the ITU H.264 coding protocol. They are reference frames that are acknowledged by a decoder upon receipt and successful decoding. The decoder transmits an acknowledgement to the encoder, whereupon the encoder assigns LTR status to the reference frame. Thus, the encoder receives express confirmation of receipt and successful decode of the LTR and may rely upon the LTR frame in subsequent coding operations.

According to the protocol 900, the encoder may code frames of the video sequence (block 910) and mark certain reference frames as LTR frames (block 920). The encoder may transmit coded video data to the decoder. Upon receipt of the coded video data, the decoder may decode it for rendering (block 930) and store reference frames locally in a reference picture cache. When the decoder successfully decodes the LTR frame, it may send an acknowledgment message 940 to the encoder advising of such. When the encoder receives the decoder's acknowledgement message 940, the encoder may revise the status of the locally stored LTR frame to indicate that receipt at the decoder has been confirmed (block 950). The operations of blocks 910-950 may repeat throughout coding of the video sequence.

When the encoder determines to build an implied reference frame, it may send a command to the decoder 960 to build the implied reference frame, identifying LTR frames that are to be used in the derivation. The decoder may build the implied reference frame upon receipt of the command message 960 (block 970) and may transmit an acknowledgment message 980 to the encoder when the implied reference frame build process completes. Further, the encoder may build its own copy of the implied reference frame in parallel (block 990). Thereafter, the encoder may code the source video sequence with reference to the implied reference frame and transmit coded video data obtained therefrom to the decoder (block 1000). The decoder may decode the coded video when it is received (block 1010).

The protocol of FIG. 9 relies upon LTR frames for derivation of the implied reference frames, which are acknowledged by the decoder and known to be valid by the encoder even before the build process begins. Such an embodiment benefits from increased reliability as compared to the embodiment of FIG. 8, where the build process may depend on reference frames that may not be present at the decoder.

According to the protocols of FIGS. 8 and 9, implied reference frames may be assigned identifiers upon creation which can be used during coding and decoding of other frames to indicate when the implied reference frames are used as source of prediction. Each new implied reference frame may be assigned a unique identifier. Thus, when an encoder uses the implied reference frame as a source of prediction of a new source frame to be coded, coded video data of the new source frame may include the implied reference frame identifier. Upon decoding, the decoder may parse the coded video data of the new source frame and use the identifier to retrieve data of the implied reference frame for prediction purposes. Moreover, if the decoder determines that it does not store an implied reference frame corresponding to the identifier, it may indicate an error to the encoder which may cause the encoder and decoder to resynchronize operations.

In an embodiment, an encoder may begin video coding with respect to the implied reference frames (block 1000) even before receiving the acknowledgment message 980 from the decoder. Such an embodiment has an advantage in that the encoder may utilize the implied reference frame immediately upon transmission of the command message 960. In such an embodiment, to guard against transmission errors that might cause the command message to be lost before decoder reception, the encoder may employ a time out mechanism (not shown). If the encoder fails to receive the acknowledgment message 980 within a predetermined time of transmitting the command message 960, the encoder may disqualify the implied reference frame from further use in coding. Moreover, an encoder may toggle between a first mode in which implied reference frames may be constructed from not-yet-acknowledged LTR frames and a second mode in which implied references frames are constructed only from already-acknowledged LTR reference frames based on a detected state of the communication channel. Mode selection may be based, for example, on rates of packet loss, signal to noise ratios, channel bandwidth or other indicia of channel conditions.

In another embodiment, implied reference frames may be used during derivation of other implied reference frames. Thus, an encoder and/or decoder may use reference frames, LTR frames and implied reference frames as sources for derivation of new implied reference frames.

As noted, coding engines 220.1, 220.2 and decoding engines 260.1, 260.2 may perform coding operations as determined by a predetermined coding protocol such as ITU H.263 or H.264. Although such coding protocols do not provide for the command and acknowledgment messages 960, 980 described hereinabove, the protocols may be amended to accommodate such messages. Accordingly, it is permissible to include a command and acknowledgement protocol as an exchange conducted between the coding engines 220.1, 220.2 and decoding engines 260.1, 260.2 of such coders.

Figure 10:
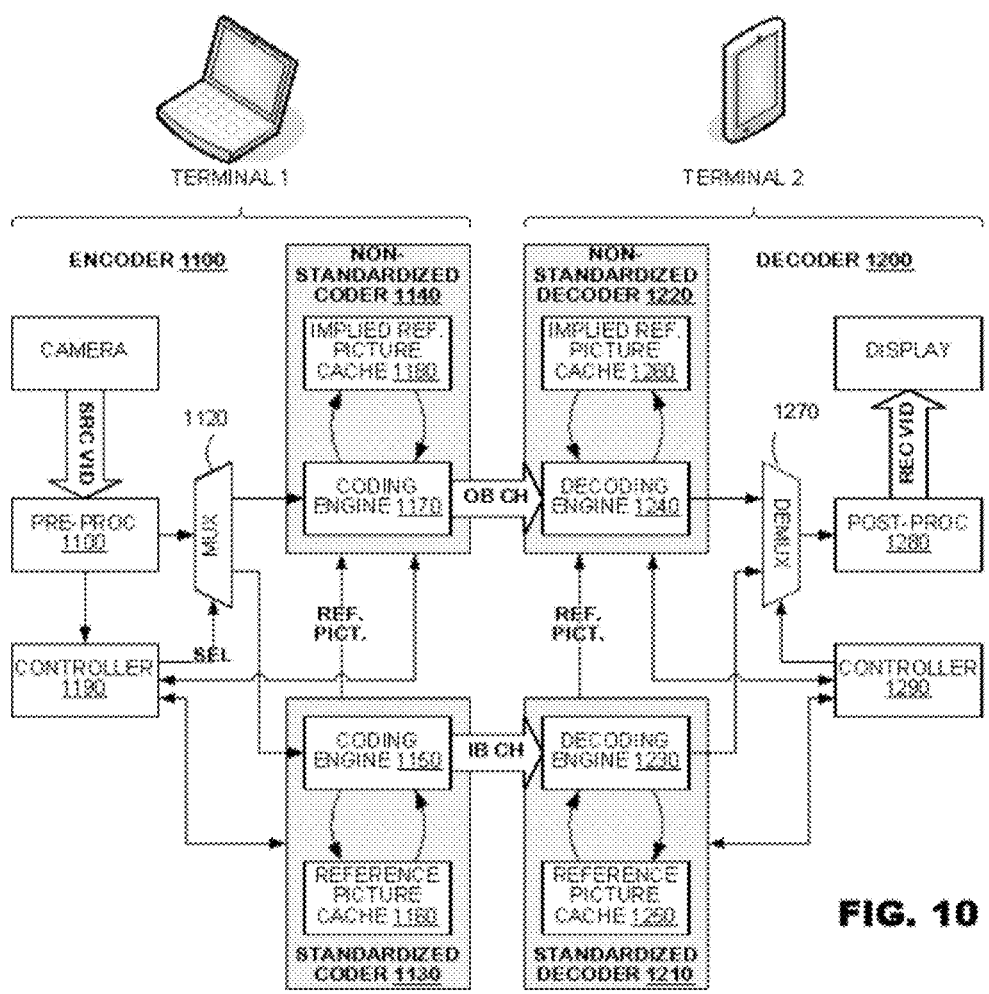
FIG. 10 is a simplified block diagram of a video coding system according to another embodiment.

Although the present invention foresees that the command/acknowledgment protocol of FIGS. 8 and 9 may be integrated into a standardized coding protocol, it is not limited to such embodiments. FIG. 10 is a simplified block diagram of a video coding system according to another embodiment that operates in which video encoders 1100 and decoders 1200 operate according to a protocol that does not accommodate the command/acknowledgement protocol directly. The video encoders 1100 and decoders 1200 may have a pair of coding/decoding paths, a first path corresponding to a standardized protocol and exchanging data according to a first communication link, called an "in band" channel (IB CH), and a second path corresponding to a non-standardized protocol in which implied reference frames may be exchanged. The second path may exchange data in a second communication link between the encoder 1100 and decoder 1220, called an "out of band" channel (OB CH). The video encoders 1100 and decoders 1200 as illustrated in FIG. 10 enable video data to be captured and coded at a first terminal, then decoded and displayed at the second terminal. Although not illustrated in FIG. 10, the system may include a second pair of video encoders and decoders to enable video data to be captured and coded at second terminal, then decoded and displayed at the first terminal.

The encoder 1100 may include a pre-processor 1110, a multiplexer 1120, a pair of coding systems 1130, 1140 representing the respective coding paths. The first coding system 1130 may operate according to the standardized coding protocol such as H.263 or H.264. It may include a coding engine 1150 and reference picture cache 1160 that generate coded video data according to procedures and syntax defined by the protocol. The second coding system 1140 also may include a coding engine 1170 and a reference picture cache 1180 (called an "implied reference picture cache"). The second coding system 1140 may code input data according to many of the same predictive coding techniques specified in the protocols of the standardized coding system 1130 but, as noted, prediction may be performed with reference to implied reference frames. Accordingly, coded video data output from the second coding system 1140 may conform to a syntax that supports reference to implied reference frames. The encoder 1100 further may include a controller 1190 that manages its operation.

During operation, as the encoder 1100 codes input video data, the controller 1190 may process coded video data to identify background elements within the video data and trigger creation of implied reference frames. The controller 1190 may cause the encoder 1100 to operate the methods of FIG. 8 or 9. In the embodiment of FIG. 10, the non-standardized coder 1140 may generate implied reference frames from reference frames stored by the standardized coder 1130. The controller 1190 may include a picture analyzer of its own but this unit is not shown separately in FIG. 10. Once the implied reference cache 1180 is populated with reference frame data of its own, new input video data may be coded either by the standardized coder 1130 or the non-standardized coder 1140. The controller 1190, in junction with the coding engines 1150, 1170, may determine which coder 1130, 1140 provides the best coding opportunity for the input frame. In selecting which coder 1130, 1140 is "best," the coder typically considers factors driven by a locally executing coding policy, such as coding efficiency, error resiliency and the like. Having selected a coder 1130, 1140 for the new input frame, the controller 1190 may engage the selected coder (say, coder 1140) to code the frame and output coded video data of the frame via its respective channel (OB CH). The controller 1190 may repeat coding operations and trigger creation of new implied reference frames until the input video sequence is consumed.

Although the coding engines 1150, 1170 are illustrated in FIG. 10 as discrete units, they need not be completely independent in all cases. As noted, the coding engines 1150, 1170 may perform common coding operations on input data. They simply use different types of reference frames for prediction purposes—standards-compliant reference frames vs. implied reference frames. Thus, when the encoder of FIG. 10 is implemented in a consumer device, the coding engines 1150, 1170 may be provisioned as a common functional unit that executes in different coding modes to operate as either a standards-compliant coding engine or a coding engine that operates with reference to implied reference frames. In such an implementation, the encoder 1100 may include additional systems (not shown) to route coded video data from the common coding engine to the in band channel or out band channel as appropriate.

FIG. 10 also illustrates a video decoder 1200 according to this embodiment. The video decoder 1200 may perform decoding operations that invert coding operations performed by the encoder 1100 and, as such, it may include an architecture that is counterpart to that of the encoder 1100. The video decoder 1200 may include a standardized decoder 1210 that receives and decodes coded video data received on the in band channel. It further may include a non-standardized decoder 1220 that receives and decodes coded video data received on the out of band channel. Each decoder 1210, 1220 may include respective decoding engines 1230, 1240 and reference picture caches 1250, 1260. The video decoder 1200 further may include a demultiplexer 1270 to merge decoded video data into a common output video sequence, a post-processor 1280 and a controller 1290.

The decoders 1210, 1220 each may invert coding operations performed by the counterpart coders 1130, 1140 at the encoder 1100. Thus, coded video data received via the in band channel IB CH may be decoded by decoding engine 1230 using prediction data stored in the reference picture cache 1250. Further, coded video data received via the out of band channel OB CH may be decoded by decoding engine 1240 using prediction data stored in the implied reference picture cache 1260. As with the encoder 1100, the decoding engines 1230, 1240 are illustrated as independent units but they need not be deployed as such. The decoding engines 1230, 1240 may perform common coding operations on coded video data input to them but they use different types of reference frames for prediction purposes—standards-compliant reference frames vs. implied reference frames. Thus, when the decoder 1200 of FIG. 10 is implemented in a consumer device, the decoding engines 1230, 1240 may be provisioned as a common functional unit that executes in different coding modes to operate as either a standards-compliant coding engine or a coding engine that operates with reference to implied reference frames.

The controller 1290 may manage operation of the decoder 1200. It may cause the non-standardized decoder 1220 to generate implied reference frames in response to commands received via the out of band channel. It may manage operation of the methods of FIG. 8 or 9 within the decoder and cause the decoder 1200 to return acknowledgment messages to the encoder 1100.

The principles of the present invention find application in a variety of real-time video coding applications and networking implementations. Although the coding/decoding systems of FIGS. 2 and 10 have illustrated implementations in which the implied reference frames are built at terminal devices, other implementations are permissible. For example, as shown in FIG. 1 in phantom, implied reference frames may be used by multi-point conference units (MCUs) 130 provided within a network. MCUs commonly are used to support multi-party conferencing services in which a plurality of terminals is engaged in a common videoconference. During the videoconference, each terminal may code video data captured locally at the terminal's location and may transmit it to the MCU 130. The MCU 130 may decode the transmitted video data and integrate the transmitted data into a video sequence for each of the other terminals. For example, the MCU may integrate decoded video data from terminals 2 and 3 may be integrated into a video sequence (perhaps a split screen presentation or a "follow the speaker" presentation) that is coded and delivered to terminal 1. Simultaneously, the MCU 130 may integrate decoded video data from terminals 1 and 3 for coding and delivery to terminal 2. In this manner, the MCU 130 acts as a intermediate agent that allows each terminal to engage in point-to-point communication (from the respective terminal to the MCU 130) but transmit coded video content to and receive coded video content from each of the other terminals engaged in the video conference.

In such an embodiment, the MCU 130 may utilize implied reference frames for terminals engaged in a video conference. If terminal 110.2 supports implied reference frames, communication between the MCU 130 and terminal 110.2 may proceed as shown in FIG. 8 or 9. Further, communication with the terminal 110.2 may proceed in this fashion even though another terminal (say, terminal 110.3) does not support implied reference frames.

Of course, it is not necessary for MCUs 130 to participate in every multi-party videoconferencing application. In some embodiments, multi-party video conferencing may be supported directly between the terminals 110.1-110.3 without an intermediary agent. In such an embodiment, the terminals may establish paired encoders and decoders as illustrated in FIG. 2 or 10. Paired encoders/decoders may be established for every paired relationship between terminals. Thus, if terminal 110.1 is engaged in a multi-party videoconference that involves simultaneous communication with terminals 110.2 and 110.3, terminal 110.1 may establish a first paired relationship with terminal 110.2 and a second paired relationship with terminal 110.3. In this instance, the architectures of FIG. 2 or 10 may be replicated for each paired relationship to which the terminal 110.1 belongs. And, of course, the terminal 110.1 may utilize implied reference frames when it is paired with a first terminal that also supports such implied reference frames (say, terminal 110.2) even if another terminal 110.3 does not support implied reference frames.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIGS. 2 and 10 illustrate the components of video coders and decoders as separate units, in one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, video coders and decoders typically will include functional units in addition to those described herein, including buffers to store data throughout the coding pipelines illustrated and communication transceivers to manage communication with the communication network and the counterpart coder/decoder device. Such elements have been omitted from the foregoing discussion for clarity.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coder management method, comprising:
   decoding coded data of a plurality of reference pictures, the coded reference picture data having been transmitted in a channel between an encoder and a decoder,
   storing the decoded reference pictures in a reference picture cache,
   building a new, implied reference picture from a plurality of the stored reference pictures, and
   storing the newly built implied reference picture in the reference picture cache,
   wherein the method is executed at an encoder and the reference picture cache storing the reference pictures and implied reference picture is located at the encoder,
   transmitting a message to a decoder commanding the decoder to derive an implied reference frame, and
   predictively coding a new input frame with reference to the stored implied reference picture only after receipt of an acknowledgment to the message from the decoder.

2. The method of claim 1, wherein the implied reference picture is derived without transmission of such through the channel.

3. The method of claim 1, wherein implied reference picture data is derived from detected areas of commonality among the reference pictures.

4. The method of claim 1, wherein implied reference picture data is derived from pixel blocks of the reference pictures identified as belonging to an image background.

5. The method of claim 4, wherein pixel blocks are identified as belonging to the image background based on motion of the respective pixel blocks.

6. The method of claim 4, wherein pixel blocks of a reference frame are identified as belonging to the image background based on a comparison of the pixel blocks' motion vectors to global motion of the reference picture.

7. The method of claim 4, wherein pixel blocks of a reference frame are identified as belonging to the image background based on a correlation between the pixel blocks and spatially neighboring pixel blocks.

8. The method of claim 1, further comprising predictively coding a new input frame with reference to the stored implied reference picture.

9. The method of claim 1, further comprising decoding coded video data of a new frame with reference to the stored implied reference picture.

10. The method of claim 9, wherein the coded video data includes an identifier of the implied reference frame as a prediction reference.

11. The method of claim 1, wherein the message identifies long term reference frames to be used to derive the implied reference frame.

12. The method of claim 1, wherein the message identifies reference frames to be used to derive the implied reference frame.

13. A video decoder management method, comprising:
  decoding coded data of a plurality of reference pictures, the coded reference picture data having been received on a channel from an encoder,
  storing the decoded reference pictures in a reference picture cache,
  deriving a new, implied reference picture from a plurality of the stored reference pictures, and
  storing the newly built implied reference picture in the reference picture cache,
  wherein the deriving is performed in response to a message received from an encoder commanding the decoder to derive an implied reference frame,
  after the implied reference frame is derived, transmitting an acknowledgment of the message to the encoder,
  wherein the method is executed at a decoder and the reference picture cache storing the reference pictures and implied reference picture is located at the decoder.

14. The method of claim 13, wherein the implied reference picture is derived without receiving such from the channel.

15. The method of claim 13, wherein implied reference picture data is derived from detected areas of commonality among the reference pictures.

16. The method of claim 13, wherein implied reference picture data is derived from pixel blocks of the reference pictures identified as belonging to an image background.

17. The method of claim 16, wherein pixel blocks are identified as belonging to the image background based on motion of the respective pixel blocks.

18. The method of claim 16, wherein pixel blocks of a reference frame are identified as belonging to the image background based on a comparison of the pixel blocks' motion vectors to global motion of the reference picture.

19. The method of claim 16, wherein pixel blocks of a reference frame are identified as belonging to the image background based on a correlation between the pixel blocks and spatially neighboring pixel blocks.

20. The method of claim 13, further comprising decoding coded video data of a new frame with reference to the stored implied reference picture.

21. The method of claim 20, wherein the coded video data includes an identifier of the implied reference frame as a prediction reference.

22. The method of claim 13, wherein the message identifies long term reference frames to be used to derive the implied reference frame.

23. The method of claim 13, wherein the message identifies reference frames to be used to derive the implied reference frame.

* * * * *